Figure 1:
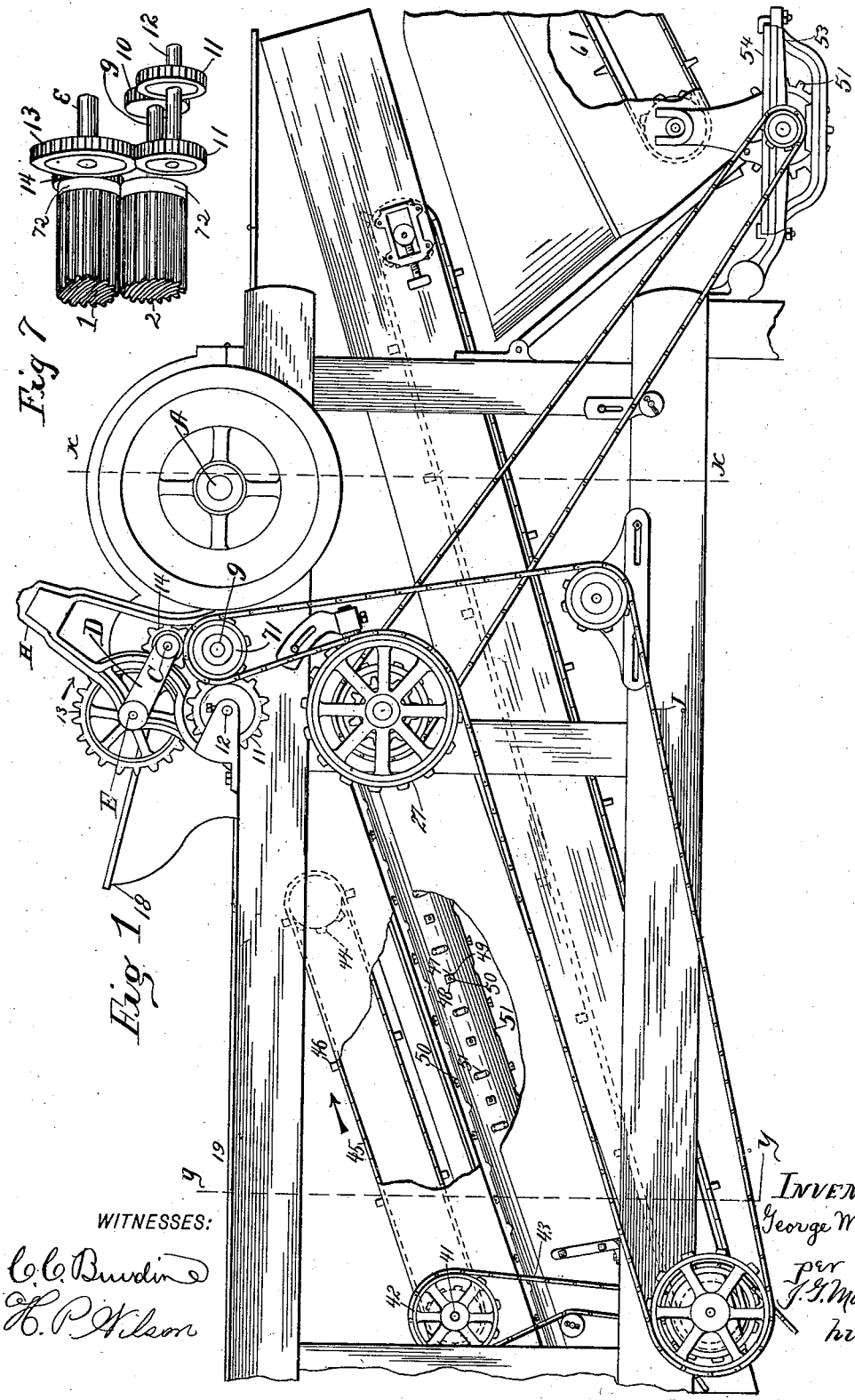

(No Model.) 4 Sheets—Sheet 1.

G. W. PACKER.
CORN HUSKER AND FODDER SHREDDER.

No. 506,642. Patented Oct. 10, 1893.

WITNESSES:
C. C. Burdin
H. P. Wilson

INVENTOR
George W. Packer
per J. J. Manahan
his Atty (No Model.) 4 Sheets—Sheet 3.

G. W. PACKER.
CORN HUSKER AND FODDER SHREDDER.

No. 506,642. Patented Oct. 10, 1893.

WITNESSES:
C. C. Burdine
H. P. Wilson

INVENTOR
George W. Packer
per
J. G. Manahan
ATTORNEY.

(No Model.)  4 Sheets—Sheet 4.
G. W. PACKER.
CORN HUSKER AND FODDER SHREDDER.
No. 506,642. Patented Oct. 10, 1893.
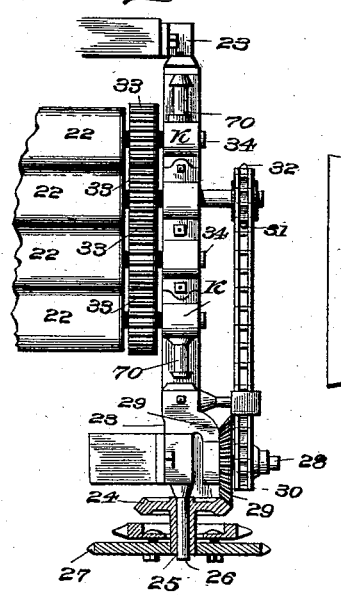
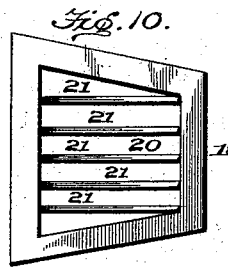
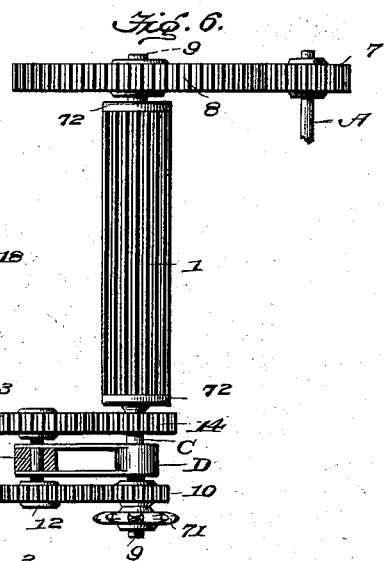
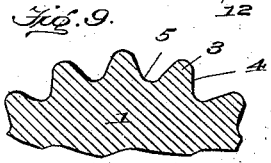
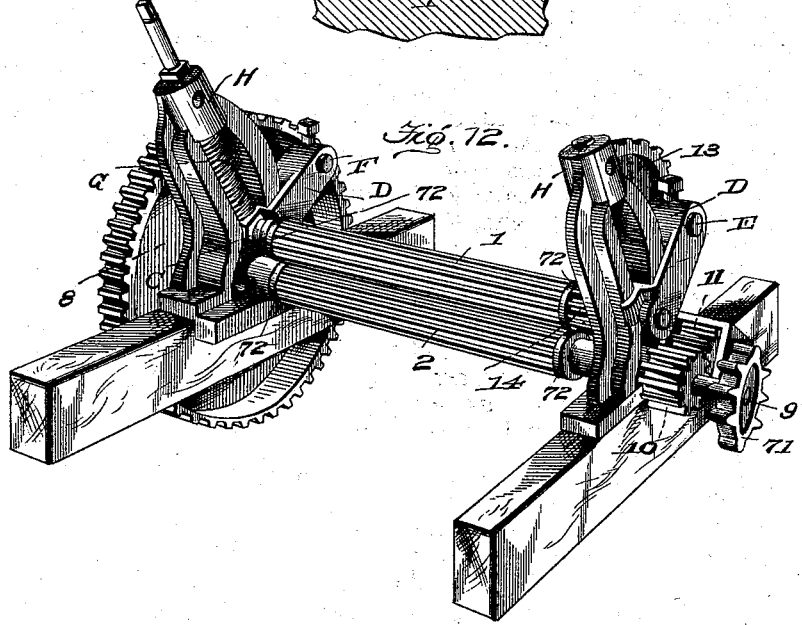
Witnesses:
Wm C Dahiell
W. H. Edwards
Inventor:
George W. Packer
By John G. Manahan
Atty.

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

CORN-HUSKER AND FODDER-SHREDDER.

SPECIFICATION forming part of Letters Patent No. 506,642, dated October 10, 1893.

Application filed September 5, 1892. Serial No. 445,115. (No model.)

*To all whom it may concern:*

Be it known that I, GEORGE W. PACKER, a citizen of the United States, residing at Rock Falls, in the county of Whiteside and State of Illinois, have invented certain new and useful Improvements in Corn-Huskers and Fodder-Shredders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to corn huskers and fodder shredders, and consists in certain improvements in different parts of the machine for which I have a Patent No. 494,511, dated March 28, 1893.

The aforesaid improvements consist, first, in the peculiar conformation of the feed rollers. These rollers also perform the function of snapping the ear from the stalk. The difficulty in their use heretofore has been in the material adhering to the lower roller and clogging it, and the interval between it and the transverse plate located between said roller and the shredding cylinder. My improvement in this regard consists in forming the periphery of both of the feed rollers of longitudinal ribs, having a circular crest with an intervening groove between them having a circular bottom, the operation of my conformation being that the pressure upon the stalks at the crest of the opposing ribs, has the effect of withdrawing or lifting the material from the groove or grooves which have preceded such opposing ribs, and thereby constantly clearing that portion of the lower roller which has passed the pressure point.

The second part of my invention consists in novel means for affording a vertical adjustability to the upper feed roller, so as to accommodate the interval between them to the thickness of the passing material. This is accomplished by seating the upper feed roller in movable arms and arranging the driving mechanism of said roller to follow the latter in the arc of its movement.

The third improvement consists in furnishing the hood which covers the fodder at and just previous to its engagement with said feed rollers, with a slatted roof whereby the operator can look diagonally downward through said slats and watch the operation of said feed rollers, and discover any obstructions thereon, without feeling in, as has heretofore been necessary and dangerous.

The fourth improvement has reference to adjusting the incline of the husking rollers, to adapt the same to different qualities of corn.

The fifth improvement has reference to means for seating and adjusting the altitude of the husk engaging projections upon the husking rollers.

The sixth improvement is the provision of an endless apron, provided with transverse slats constantly traversing the space above the husking rollers, a sufficient distance therefrom to clear an ear of corn lying thereon, but, near enough in passing, to push overriding ears endwise until they drop into a vacant interval on the husking rollers, and also to throw down any ears engaged at one end by the husking rollers and therefore standing erect—operations which have heretofore been done by hand, and which were dangerous from the engaging character of the projections on said rollers.

I attain the objects aforesaid by the mechanism illustrated in the accompanying drawings, in which—

Figure 2:
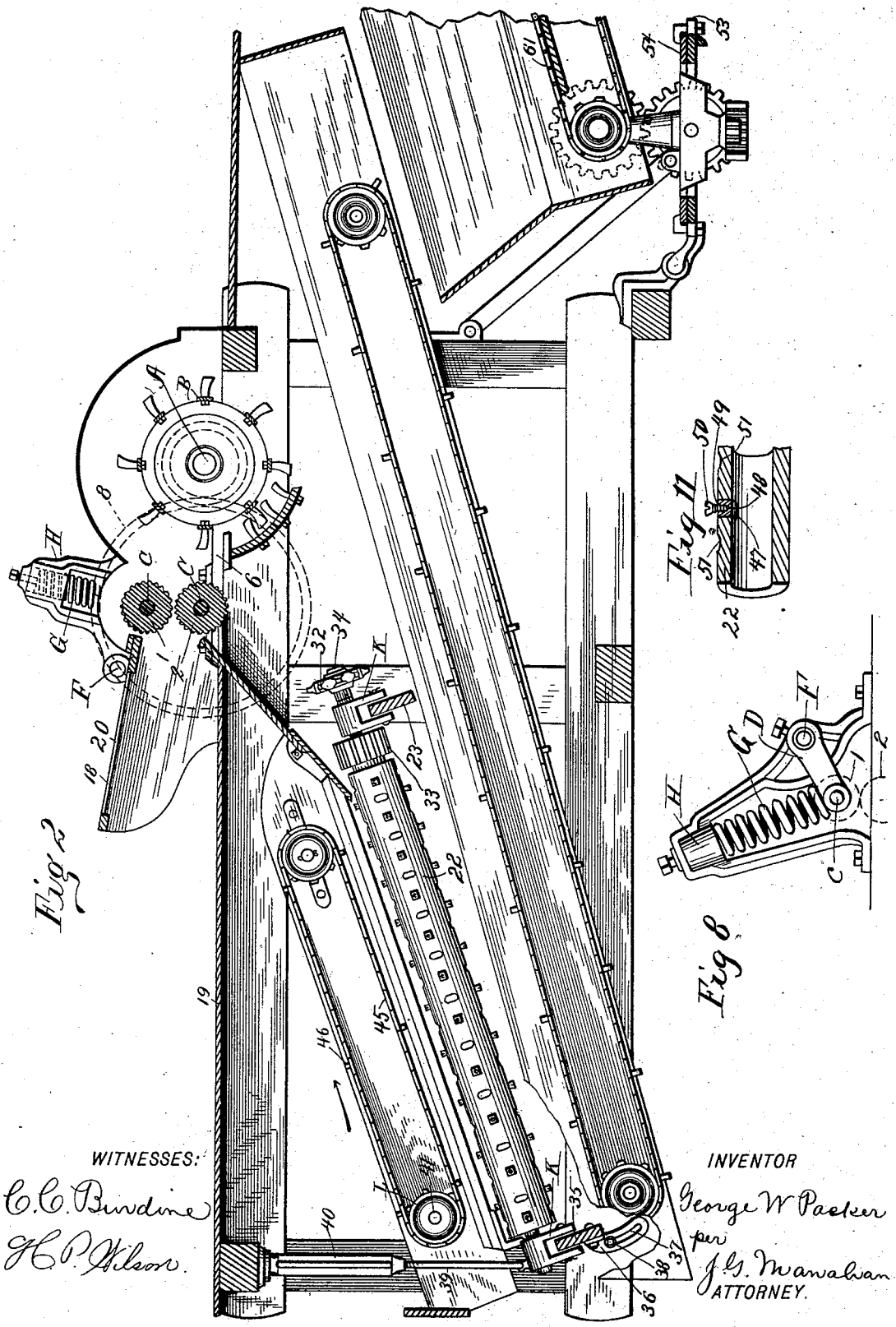
Figure 3:
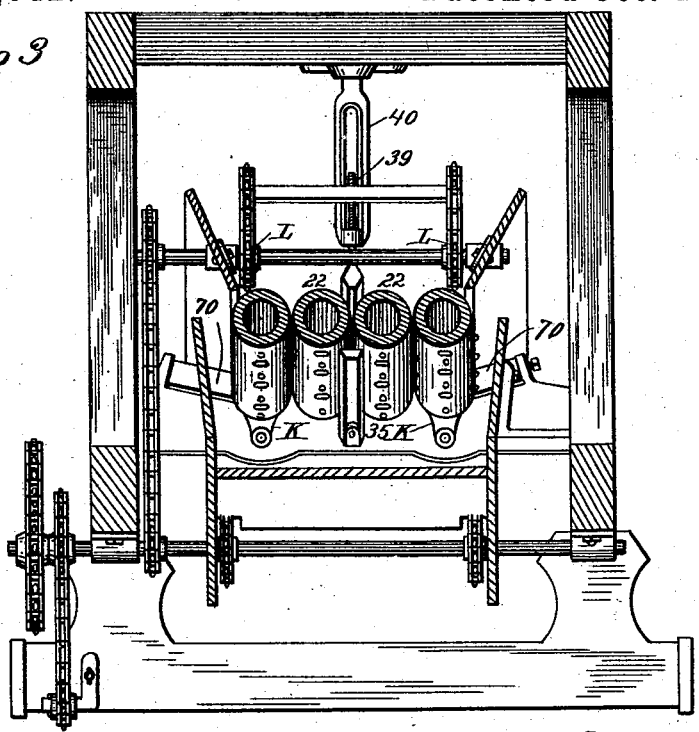
Figure 4:
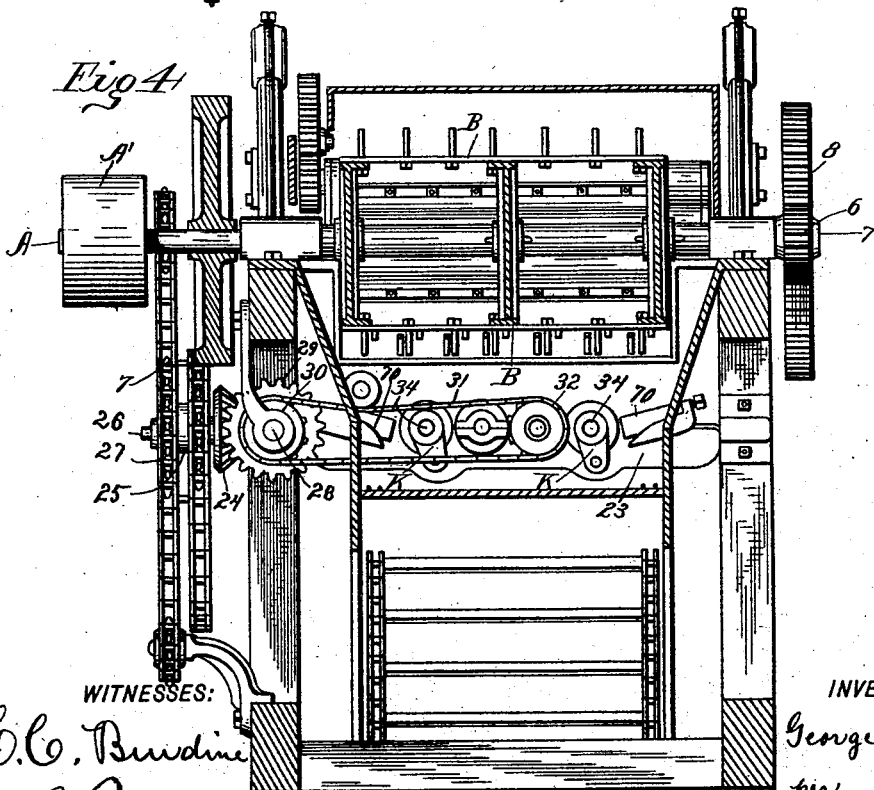

Figure 1 is a side elevation of that portion of the machine embodying my improvements. Fig. 2 is a vertical, longitudinal section from the lower end of the husking rollers to and including the lower portion of the fodder discharging elevator. Fig. 3 is a cross-section in the line Y—Y of Fig. 1. Fig. 4 is a cross-section in the line X—X of Fig. 1. Fig. 5 is a detail plan, partly in section, of the upper end of the husking rollers and their driving mechanism. Fig. 6 is a detail plan of one of the feed rollers, and the driving mechanism thereof. Fig. 7 is a detail of the driving mechanism of the feed rollers. Fig. 8 is a detail of the opposite end of said feed rollers. Fig. 9 is an enlarged cross-section of a feed roller. Fig. 10 is a view of the top of the hood, over the inner, or discharge, end of the feed table. Fig. 11 is a detail, longitudinal, sectional view through one of the husking rollers, and Fig. 12 is a perspective view of the feed rolls and the operating mechanism therefor.

Similar letters and numbers refer to similar parts throughout the several views.

Referring to the first part of the invention named, that of the conformation of the periphery of the feed rollers, 1, and 2, are such rollers placed at the usual locality in the machine and adapted to both snap the ear from the stalk, and also to feed the latter to the shredding cylinder located adjacently. On the periphery of each roller, 1 and 2, are formed straight ribs 3, extending lengthwise of the rollers the full distance of their operative surface. The peculiarity of these ribs is that the crowns 4 thereof are formed in circle in cross-section. Intermediate of the ribs 3 are formed longitudinal grooves 5, having their lower surface circled in cross-section, like the crest 4 of the ribs 3. The purpose and advantage of this construction are that the circular form of the grooves 5 prevents the walls of such groove from grasping any portion of the fodder after such groove has passed the point of pressure from the adjacent roller, and the subsequent pressure on the fodder has the effect of lifting it out of the preceding grooves, from whence it is passed directly over the intervening transverse plate 6, into the shredding mechanism, and all clogging of the feed rollers thereby prevented. The rollers 1 and 2 must be prevented from inter-meshing, as that would pack the fodder so tightly, in grooves 5, that it would remain there, and soon clog the rollers. To prevent this inter-meshing there is formed at the ends of the ribs 3 of each of said rollers, a smooth portion 72, an inch or more in width, and of a diameter equal to that of the operative portion of said rollers, through the crowns 4 of ribs 3, as shown in Fig. 6. The smooth portion 72 on the respective rollers, being opposite, prevent the ribbed portions of the rollers from inter-meshing, as shown in Fig. 2, while the interposed stalks are crimped, more or less, into the grooves 5.

Referring to the vertical adjustability of the feed rollers, 1 and 2,—the roller 2 is suitably journaled on the frame of the machine, and is driven by the spur-gear 7, on shaft A of the shredder B, engaging a large spur-gear 8, seated upon the shaft 9 of said roller said shaft A being driven from the general driving pulley A'. On the opposite end of shaft 9 there is keyed a spur pinion 10, which engages one of the twin pinions 11, loosely seated on a short shaft 12, seated on the frame of the machine directly in front of the shaft 9. The other or inner twin pinion 11 is seated under and drives gear 13, adapted to engage a pinion 14, keyed upon the shaft C of roller 1, which shaft C is journaled in the lower end of arms D—D, one of which arms is pivoted at its opposite end on the axle E of wheel 13, and the other on a short stud F at opposite side of machine. A spring G, suitably seated under bracket H at one end of shaft C of upper roller 1, holds the latter down adjustably at that end, and the gear 13 aforesaid, by its top running toward shaft C, holds the latter down adjustably at the other end of said shaft; but pinion 14 on shaft C is free to rise around gear 13, when the pressure between the rollers 1 and 2 is excessive.

Referring to the third part of my invention, 18 is the usual hood over the inner end of the feed table 19, under which the stalks are fed to the feed rollers 1 and 2. Heretofore the interior of the hood 18 has been comparatively dark, and any obstructions in the feed rollers had to be discovered by feeling with the hands, and the adjustment or removal thereof was rendered difficult and hazardous by the want of ability to see the nature of the difficulty. In order to obviate this, I have formed in the deck, or upper side, of the hood 18, an opening 20, and to prevent any casual passage of the hands therein, have covered the same with a series of rods 21, as shown in Fig. 10.

Referring to the adjustability (see Fig. 5) of the incline of the husking rollers 22, the upper ends of said rollers are suitably journaled in a transverse bar 23, suitably journaled at its ends on the frame of the machine. A beveled gear 24 is integral with a sleeve 25, and with said sleeve is seated loosely on a spindle 26 suitably attached to the frame of the machine at one end of the bar 23, and in line thereof. Near the outer end of the sleeve 25 there is keyed a sprocket wheel 27, driven by the chain J, by means of which a rotation is imparted to the beveled gear 24, said chain being driven by sprocket wheel 71 on shaft 9 of roller 2. Integral with the bar 23 and perpendicular thereto is formed another spindle 28, upon which is seated a beveled gear 29, adapted to be actuated by the gear 24. Adjacent to the gear 29, and integral therewith, is formed a sprocket wheel 30, from which a sprocket chain 31 extends to and connects a sprocket wheel 32 on an extension of the shaft of one of the inner husking rollers 22. Gear wheels 33 are keyed to the upper ends of the shafts 34 of the husking rollers 22, between said rollers and the bar 23, by means of which the rotation of the sprocket wheel 32 keeps the tops of each side pair of husking rollers rotating toward each other. It will be noticed that this construction permits the lower end of the husking rollers to be raised or lowered without disturbing the driving mechanism of said rollers, as the gear 29, sprocket wheels 30 and 32, and the chain 31 are carried in an arc having the same center as the axis of the bar 23, and the sprocket wheel 27 and gear 24 being seated on the prolongation of said axis, the gear 29 simply travels around the periphery of gear 24 in any rotation of the bar 23. Rubber cushions 70 are placed outside of the journal bearings of the outer rollers 22, to permit the lateral yielding of said rollers to an excess of husks passing between them, respectively, and their interior roller, the outside rollers 22 being seated in vertical arms K, suitably pivoted at their lower ends to upper cross-bar 23 and cross-bar 35, to permit such yielding. The lower ends of husking rollers 22 (see Figs. 2 and 3) are all journaled on a cross-bar 35, which is seated on a yoke 36, provided with a curved slot 37 held to the frame of the machine by a bolt 38, and by loosening the latter bolt the yoke 36 can be raised or lowered as desired. The side rollers 22 have the yoke K connecting to bar 35. After loosening said nut, in order to effect the adjustment, there is provided a vertical rod 39 attached centrally, at its lower end, to the bar 35, and threaded at its upper end and a long turn buckle 40, swiveled at its upper end to the frame of the machine, is threaded at its lower end and screwed at will upon the rod 39, whereby the lower ends of all of the husking rollers can be raised or lowered as desired, and when thus adjusted, held in place by tightening the bolt 38.

Referring to the ear adjuster (Figs. 1 and 2), a shaft 41 is suitably journaled transversely of the machine across and slightly above the husking rollers 22, near the lower ends of the latter, upon which there is keyed a sprocket wheel 42, driven by a chain 43. Sprocket wheels 44 are suitably seated to the side of the machine a like distance above said husking rollers near the upper ends of the latter, and an apron 45, provided with transverse projecting slats 46, is carried on sprocket wheels L, on shaft 41, and on the wheels 44. By the rotation of the shaft 41, the transverse slats 46 are caused to sweep downward over the husking rollers 22, a sufficient distance above the latter to clear any ear of corn lying in the depression between said rollers, but sufficiently near to engage any over-riding ear, or any ear which in the process of husking may have been held erect by its husks projecting downward between the rollers. In the case of the latter ears, said slats knock them down by breaking them loose from their engaged husks, so that the peripheral projections on the husking rollers will engage the sides of said ears, and in the case of over-riding ears, said slats engage the same and carry them past the lower ear, and permit them to drop in the vacant intervals in the lower stratum of ears. Thus the apron 45 has the constant effect to keep the feed and operation of the husking rollers uniform, and not only dispenses with any necessity for the operator using his hands, but by crowding all the ears into engagement with the husking rollers, the capacity of the machine is largely increased.

Referring to the fifth part of my invention, there has been trouble heretofore in procuring suitable husk engaging projections for the husking rollers. The condition of the corn, and the different kinds thereof, require a change in the altitude of said projections at different times. When the husks are dry, a longer projection is necessary. These projections must necessarily be metallic, and heretofore it has been found impracticable to seat them adjustably in husking rollers, by reason of their rusting into said rollers from wet or dampness. In order to accomplish such adjustability, I form in the periphery of each husking roller screw plug seats 47 in longitudinal lines, and drive tightly within the same a wooden plug 48, provided centrally with a screw-hole 49. After the plug 48 is driven down even with the surface of the husking roller, I insert in the opening in said plug screws 50, the projecting heads of which form excellent husking engagers, and as the screw threads rest within the plugs 48, such screws can be driven in or withdrawn, so as to furnish any desired degree of projection beyond the surface of the roller. But I do not limit myself to the screw form of projections 50. Intermediate the openings 47, there are formed in the husking rollers, transverse oblong depressions 51, within which the projections 50 of the opposite roller pass in the rotation of said roller.

After the corn has been husked and the fodder shredded it is desirable that it be removed from the machine. One means for doing this which I have found very efficient is by an elevator or carrier 61 which is pivotally secured to the machine by two circles 53 and 54. The apron of the carrier is driven by any suitable means, as the gearing 51, which, in turn, may be driven from the operating mechanism of the machine.

As I make no claim to the above described means for taking the shredded material from the machine, I do not deem a more extended description of the same necessary.

What I claim as my invention, and desire to secure by Letters Patent of the United States, is—

1. The snapping and feeding rollers 1 and 2, provided peripherally with alternated ribs 3, and grooves 5, said ribs having rounded crowns 4, and said grooves rounded bottoms; and provided respectively, at each end with opposing smooth portions 72, substantially as shown, and for the purpose described.

2. The combination of the suitably driven gear wheel 13, stud F, arms D—D pivoted, respectively, on one end on stud F, and the axle of wheel 13, roller 1 pivotally seated in the opposite ends of arms D—D, pinion 14, bracket H, and spring G; substantially as shown, and for the purpose described.

3. The combination of husking rollers 22, provided respectively with inter-connected spur gears 33, sprocket wheel 32 seated on the axle of one of said rollers, transversely journaled bar 23 supporting the upper ends of said rollers 22, suitably driven bevel gear 24 seated in the axial line of said bar, spindle 28 formed on bar 23 perpendicular thereto, beveled gear 29, chain 31, and means substantially as shown for adjusting the altitude of the lower ends of said rollers, as and for the purpose specified.

4. The husking rollers 22, provided peripherally with plug seats 47, and wooden plugs 48, and projections 50 seated therein; substantially as shown, and for the purpose described.

5. The combination of the husking rollers 22, provided with plug seats 47, and depressions 51, the wooden plugs 48 placed in said seats, and threaded projections 50 adjustably seated, radially, in said plugs; substantially as shown, and for the purpose described.

6. The combination of the cross-bars 23 and 35, inner husking rollers 22, pivoted therein, arms K pivotally seated on said bars, outer husking rollers 22 seated in the opposite end of arms K, and rubber cushions 70, adapted to adjustably press inward on said outer rollers; substantially as shown, and for the purpose described.

In testimony whereof I affix my signature in presence of two witnesses.

GEORGE W. PACKER.

Witnesses:
JOHN G. MANAHAN,
MARTHA W. BARRETT.